(12) United States Patent
Seok et al.

(10) Patent No.: US 10,973,052 B2
(45) Date of Patent: Apr. 6, 2021

(54) TRANSMISSION BETWEEN BASIC SERVICE SETS IN WIRELESS NETWORKS CONSIDERING SPATIAL REUSE

(71) Applicant: MediaTek Singapore Pte. Ltd., Solaris (SG)

(72) Inventors: Yongho Seok, San Jose, CA (US); James June-Ming Wang, San Jose, CA (US); Chao-Chun Wang, San Jose, CA (US); Chih-Shi Yee, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 76 days.

(21) Appl. No.: 16/179,196

(22) Filed: Nov. 2, 2018

(65) Prior Publication Data

US 2019/0141749 A1  May 9, 2019

Related U.S. Application Data

(60) Provisional application No. 62/582,366, filed on Nov. 7, 2017, provisional application No. 62/629,183, filed on Feb. 12, 2018, provisional application No. 62/656,561, filed on Apr. 12, 2018.

(51) Int. Cl.
| | |
|---|---|
| *H04W 74/08* | (2009.01) |
| *H04W 72/04* | (2009.01) |
| *H04W 84/12* | (2009.01) |
| *H04W 80/02* | (2009.01) |
| *H04W 80/08* | (2009.01) |

(52) U.S. Cl.
CPC ... *H04W 74/0816* (2013.01); *H04W 72/0446* (2013.01); *H04W 72/0473* (2013.01); *H04W 74/0808* (2013.01); *H04W 80/02* (2013.01); *H04W 80/08* (2013.01); *H04W 84/12* (2013.01)

(58) Field of Classification Search
CPC ......... H04W 74/0816; H04W 74/0808; H04W 72/0446; H04W 72/0473; H04W 84/12; H04W 80/02; H04W 80/08; H04W 16/14
See application file for complete search history.

(56) References Cited

U.S. PATENT DOCUMENTS

| | | | |
|---|---|---|---|
| 2016/0135225 A1 | 5/2016 | Kwon et al. | |
| 2016/0330663 A1* | 11/2016 | Zhou | H04W 4/025 |
| 2017/0055160 A1* | 2/2017 | Barriac | H04W 16/14 |
| 2018/0167970 A1 | 6/2018 | Yoshimura et al. | |

FOREIGN PATENT DOCUMENTS

WO    2016195011 A1    12/2016

OTHER PUBLICATIONS

Graham Smith, A Unified Approach to Spatial Reuse, IEEE 802.11-16/1064r3, Oct. 2016, XP068110636; 14 pgs.

* cited by examiner

*Primary Examiner* — Dady Chery

(57) ABSTRACT

A data unit (e.g., a physical layer convergence procedure (PLCP) protocol data unit (PPDU)) is detected at a first wireless device that is a member of a basic service set (BSS). The data unit was sent on a channel from a second wireless device that is a member of an overlapping basic service set (OBSS). When the first wireless device ignores the data unit and obtains a transmit opportunity for the channel according to a spatial reuse procedure, then the first wireless device is prohibited from transmitting a frame to a device that is a member of the OBSS during the time interval associated with the transmit opportunity.

20 Claims, 9 Drawing Sheets

TRANSMISSION BETWEEN BASIC SERVICE SETS IN WIRELESS NETWORKS CONSIDERING SPATIAL REUSE

RELATED APPLICATIONS

This application claims priority to U.S. Provisional Application No. 62/582,366, entitled "Inter-BSS Transmission Considering on Spatial Reuse," filed on Nov. 7, 2017, to U.S. Provisional Application No. 62/629,183, entitled "Inter-BSS Transmission Considering on Spatial Reuse," filed on Feb. 12, 2018, and to U.S. Provisional Application No. 62/656,561, entitled "Inter-BSS Transmission Considering on Spatial Reuse," filed on Apr. 12, 2018, which are hereby incorporated by reference in their entirety.

BACKGROUND

Wireless devices are becoming widely prevalent, and requests for access to wireless channels are increasing. Efficient use of the resources in a wireless local-area network (WLAN) is important to provide bandwidth and acceptable response times to the users of the WLAN.

A next generation WLAN, known as High-Efficiency (HE) WLAN (HEW), is being developed and defined in the IEEE 802.11ax standard. HEW aims at improving the performance of high-capacity, high-data rate services while supporting concurrent accesses in an environment in which a number of basic service sets (BSSs) are densely deployed and the coverage areas of the BSSs overlap (each BSS includes an access point (AP) and a number of wireless stations (STAs) associated with the AP).

BSS color is a mechanism that can be used to identify overlapping basic service sets (OBSSs). A BSS color is a numerical identifier associated with a particular BSS. Devices (STAs and APs) are able to differentiate between BSSs using the ESS color identifiers when other devices transmit on the same channel. If a receiving device detects a frame that has a BSS color that is the same as that of the receiving device, then this is considered to be an intra-BSS transmission. In other words, the transmitting device belongs to the same BSS as the receiving device. If the detected frame has a BSS color that is different from that of the receiving device, then the receiving device considers that frame to be an inter-BSS frame from an OBSS.

To improve performance and make more efficient use of limited frequency-spectrum resources in environments where BSSs are densely deployed, the IEEE 802.11ax standard implements a spatial reuse technique. In spatial reuse, STAs may spatially reuse channels of the wireless medium.

More specifically, when certain conditions are met, a device may choose to ignore an inter-BSS frame, in which case the device considers the channel used to transmit the frame as being idle and available for reuse. However, this can result in collisions between frame packets. As a result of such collisions, the packets are lost and need to be retransmitted, which is not efficient.

This problem is illustrated in more detail in the examples of FIGS. 1A and 1B, 2A and 2B, and 3A and 3B. With reference first to FIG. 1A, a BSS 102 includes an AP 103, a BSS 104 includes a STA 105 associated with an AP 106, and the AP 106 is associated with the AP 103. A BSS color one (1) is associated with the BSS 102, and a BSS color two (2) is associated with the BSS 104. The APs 103 and 106 may be multi-APs (in a multi-AP architecture, each STA can associate with multiple APs). In this example, the AP 106 transmits a HE data unit (e.g., a physical layer convergence procedure (PLCP) protocol data unit (PPDU)) that has BSS color 1 to the AP 103, and the STA 105 transmits a HE PPDU that has BSS color 2 to the AP 106. The STA 105 considers the HE PPDU addressed from the AP 106 to the AP 103 to be an inter-BSS PPDU because the BSS color in the received HE PPDU does not match the BSS color (color 2) associated with the BSS 104. Consequently, after obtaining a transmission opportunity (TXOP), a transmission from the STA 105 to the AP 106 causes a collision in the AP 106.

With reference now to FIG. 1B, the STA 105 transmits a HE PPDU that has BSS color 2 to the AP 106, and the AP 103 transmits a HE PPDU that has BSS color 1 to the AP 106. The AP 103 considers the HE PPDU addressed from the STA 105 to the AP 106 to be an inter-BSS PPDU because the BSS color in the received HE PPDU does not match the BSS color (color 1) associated with the BSS 102. Consequently, after obtaining a TXOP, a transmission from the AP 103 to the AP 106 causes a collision in the AP 106.

With reference to FIG. 2A, a BSS 202 includes an AP 203 and an associated STA 207, and a BSS 204 includes a STA 205 associated with an AP 206. A BSS color 1 is associated with the BSS 202, and a BSS color 2 is associated with the BSS 204. In this example, the APs 203 and 206 may be mesh APs. The AP 203 transmits a HE PPDU that has BSS color 1 to the AP 206, and the STA 205 transmits a HE PPDU that has BSS color 2 to the AP 206. The STA 205 considers the HE PPDU addressed from the AP 203 to the AP 206 to be an inter-BSS PPDU because the BSS color in the received HE PPDU does not match the BSS color (color 2) associated with the BSS 204. Consequently, after obtaining a TXOP, a transmission from the STA 205 to the AP 206 causes a collision in the AP 206.

With reference to FIG. 2B, the AP 206 transmits a HE PPDU that has BSS color 2 to the AP 203, and the STA 207 transmits a HE PPDU that has BSS color 1 to the AP 203. The STA 207 considers the HE PPDU addressed from the AP 206 to the AP 203 to be an inter-BSS PPDU because the BSS color in the received HE PPDU does not match the BSS color (color 1) associated with the BSS 204. Consequently, after obtaining a TXOP, a transmission from the STA 207 to the AP 203 causes a collision in the AP 203.

With reference to FIG. 3A, a BSS 302 includes a STA 307 and an independent BSS (IBSS) STA 303 and infrastructure AP1, and a BSS 304 includes a STA 305 and an IBSS STA 306 and infrastructure AP2. A BSS color 1 is associated with the BSS 302, and a BSS color 2 is associated with the BSS 304. The IBSS STA 303 transmits a HE PPDU that has BSS color 1 to the IBSS STA 306, and the STA 305 associated with the infrastructure AP2 transmits a HE PPDU that has BSS color 2 to the infrastructure AP2. The STA 305 considers the HE PPDU addressed from the IBSS STA 303 to the IBSS STA 306 to be an inter-BSS PPDU because the BSS color in the received HE PPDU does not match the BSS color (color 2) associated with the BSS 304. Consequently, after obtaining a TXOP, a transmission from the STA 305 to the infrastructure AP2 causes a collision in the infrastructure AP2.

With reference to FIG. 3B, the IBSS STA 306 transmits a HE PPDU that has BSS color 2 to the IBSS STA 303, and the STA 307 transmits a HE PPDU that has BSS color 1 to the infrastructure AP1. The STA 307 considers the HE PPDU addressed from the IBSS STA 306 to the IBSS STA 303 to be an inter-BSS PPDU because the BSS color in the received HE PPDU does not match the BSS color (color 1) associated with the BSS 204. Consequently, after obtaining a TXOP, a transmission from the STA 307 to the infrastructure AP1 causes a collision in the infrastructure AP1.

SUMMARY

Embodiments according to the present invention address the issues described above by providing methods (and devices and networks that implement those methods) for spatially reusing channels for transmissions between basic service sets (inter-BSS transmissions).

In embodiments, a data unit (e.g., a physical layer convergence procedure (PLCP) protocol data unit (PPDU)) is detected at a first wireless device (e.g., an access point, AP) that is a member of a basic service set (BSS). The data unit was sent on a channel from a second wireless device (e.g., a non-AP station) that is a member of an overlapping basic service set (OBSS), and so the data unit may be referred to as an inter-BSS data unit or an OBSS data unit. When the first wireless device ignores (disregards) the data unit and obtains a transmit opportunity (TXOP) for the channel (which is now identified as idle according to a spatial reuse procedure), then the first wireless device is prohibited from transmitting a frame to a device that is a member of the OBSS during the time interval associated with the TXOP. In an embodiment, during the time interval associated with the TXOP, the first wireless device is also prohibited from transmitting a broadcast public action frame. These mechanisms advantageously avoid the collision problem discussed above.

In embodiments, the first wireless device ignores an OBSS data unit under certain conditions specified in the spatial reuse procedure. That is, under prescribed conditions, the first wireless device will treat an inter-BSS PPDU that is detected on a channel as not having been received at all, and consequently the first wireless device will not update the network allocation vector (NAV) and resets the clear channel assessment state from busy to idle before the data unit is completely received, making the channel available for use.

In embodiments, the data unit is identified as an OBSS or inter-BSS data unit based on a color value (color identifier) included in a field of the data unit. Thus, in embodiments, a frame (e.g., a beacon frame or an event report frame) that includes a field that identifies a color value associated with the OBSS is sent from the OBSS to the BSS. The color identifier is subsequently used to determine whether a wireless device of the BSS is prohibited from transmitting to a wireless device of the OBSS during a TXOP on a channel identified as idle according to the spatial reuse procedure.

Thus, for example, an AP of a BSS can receive a frame from a non-AP station of an OBSS that identifies, to the AP, a color value associated with the non-AP station (that is, the frame includes the color value associated with the OBSS). The AP can subsequently ignore a data unit that includes the color value (that is, the data unit includes the color value associated with the OBSS). Accordingly, the AP is prohibited from transmitting to the non-AP station during a specified time interval (e.g., the time interval associated with a TXOP).

Embodiments according to the present invention result in fewer collisions between frame packets. Consequently, fewer packets are lost, reducing the number of packets that need to be retransmitted, and therefore making more efficient use of device and network resources including computational resources and bandwidth.

Embodiments according to the present invention thus improve computer technologies (e.g., by improving the efficiency and performance of wireless communication devices) and computer-related technologies (e.g., by improving the quality and performance of wireless networks).

These and other objects and advantages of the various embodiments according to the present invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments according to the present invention and, together with the detailed description, serve to explain the principles of the invention.

DETAILED DESCRIPTION

Figure 1A:
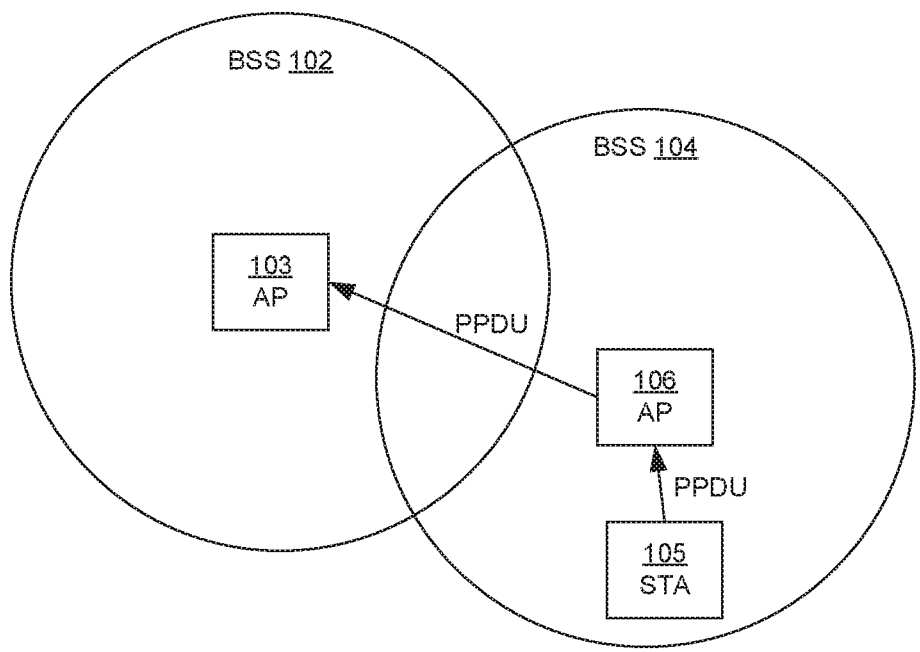
FIGS. 1A and 1B, 2A and 2B, and 3A and 3B illustrate examples of conventional spatial reuse in a wireless network.
Figure 1B:
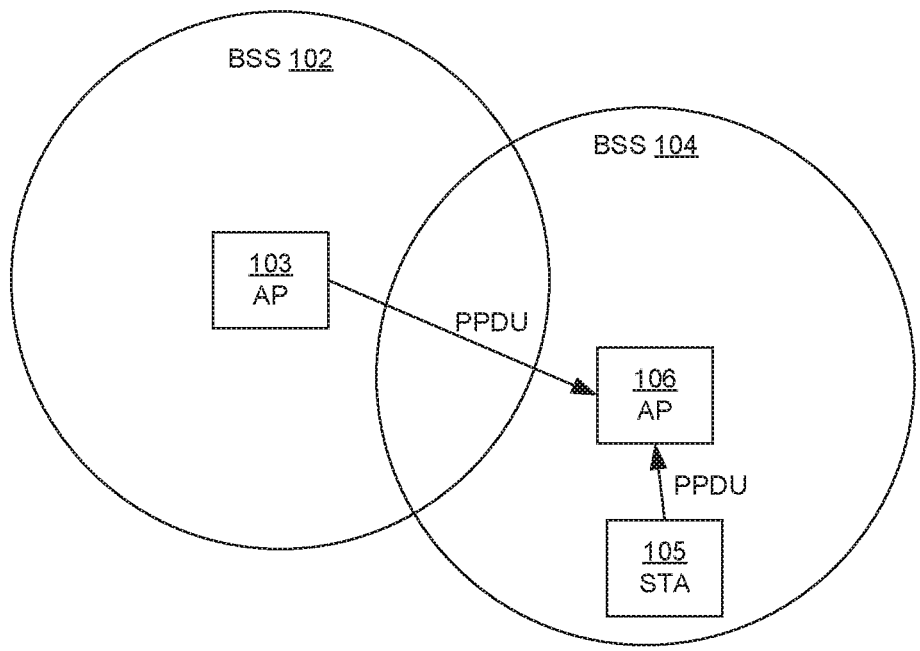
Figure 2A:
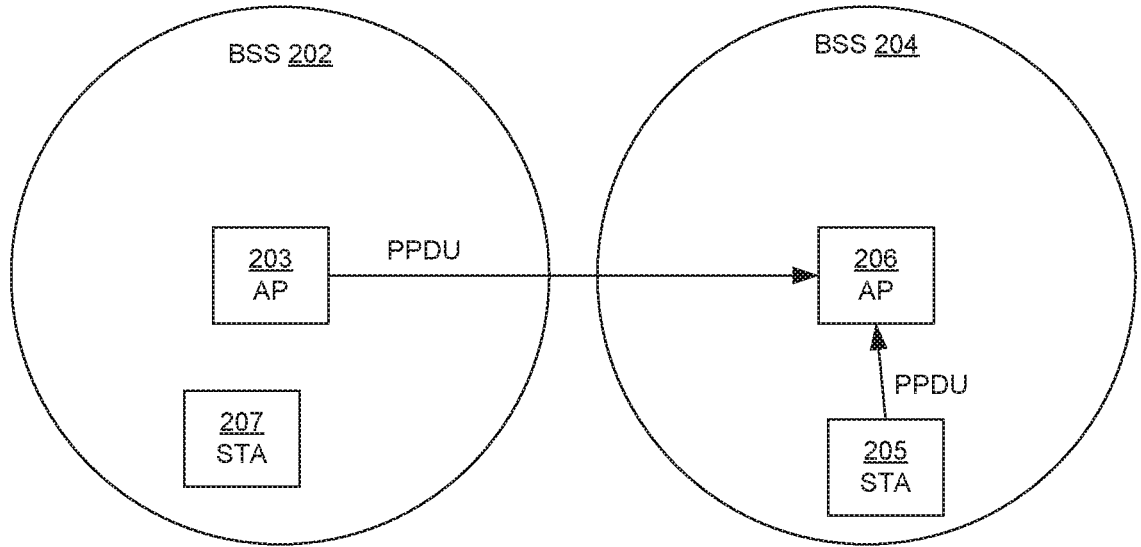
Figure 2B:
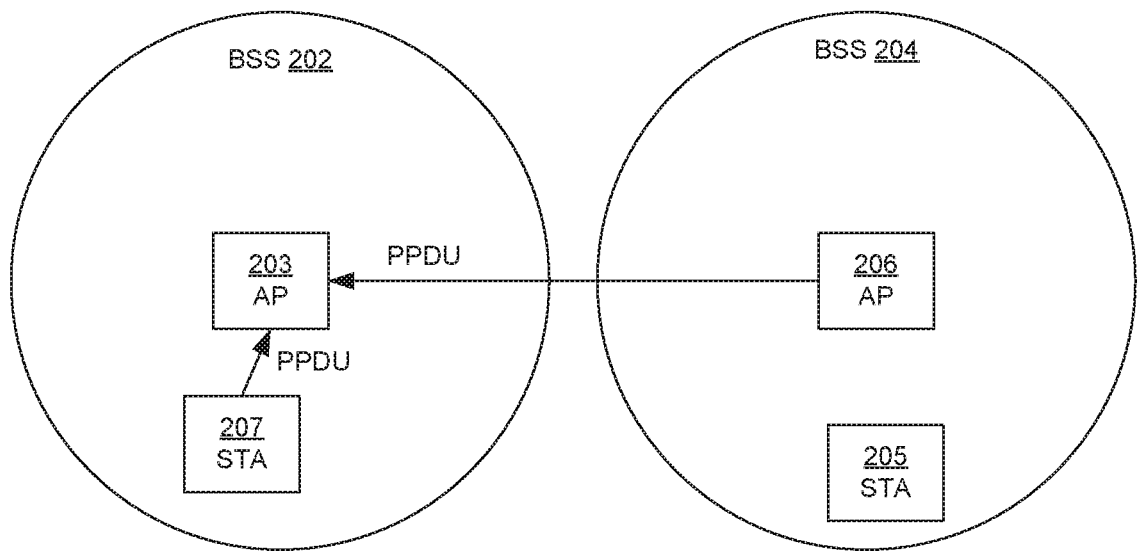
Figure 3A:
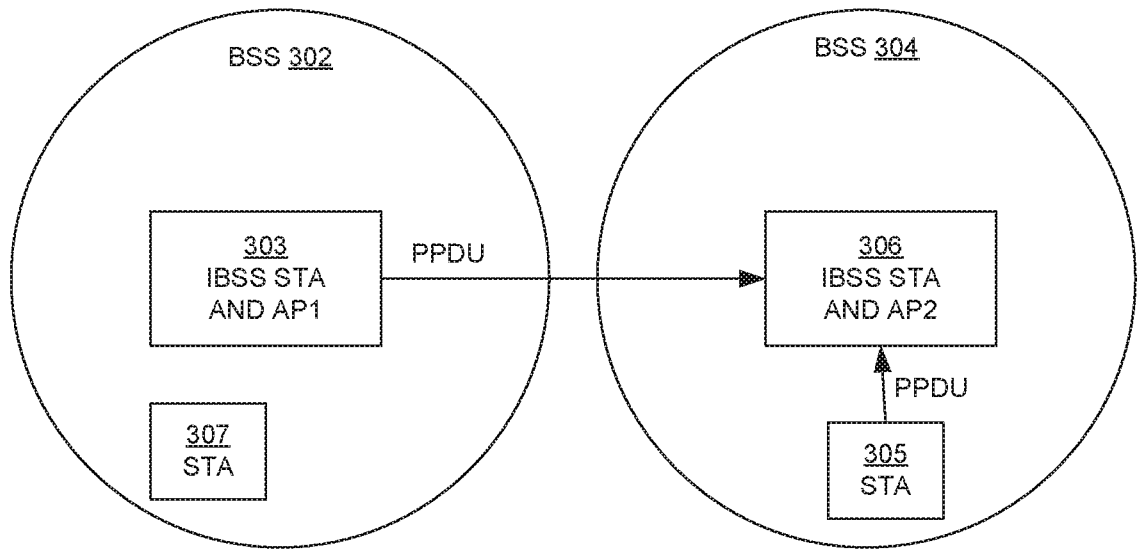
Figure 3B:
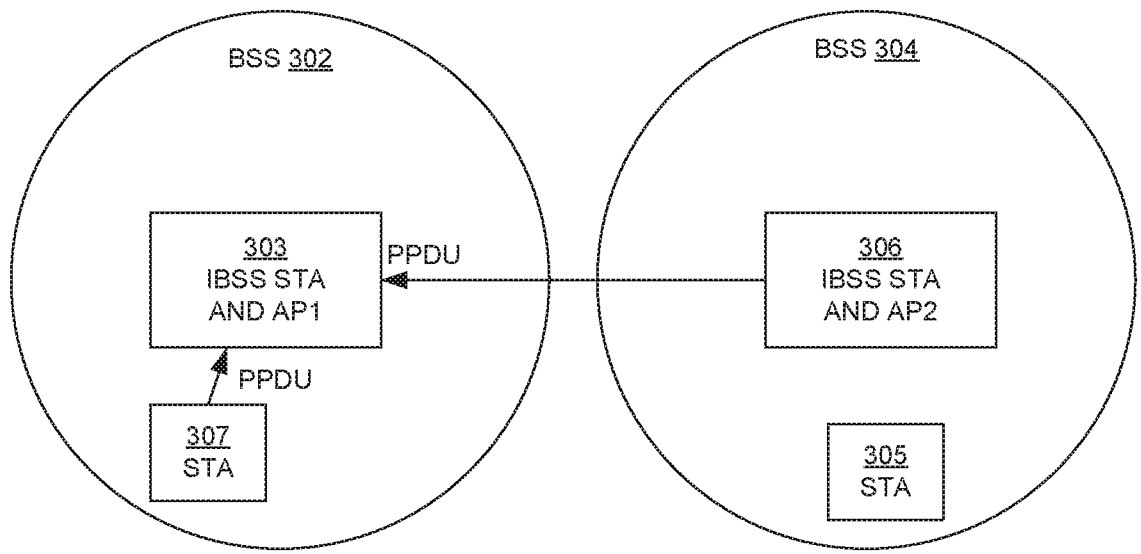

Reference will now be made in detail to the various embodiments according to the present invention, examples of which are illustrated in the accompanying drawings. While described in conjunction with these embodiments, it will be understood that they are not intended to limit the invention to these embodiments. On the contrary, the disclosure is intended to cover alternatives, modifications and equivalents, which may be included within the spirit and scope of the disclosure as defined by the appended claims.

Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "sending," "transmitting," "receiving," "determining," "indicating," "identifying," "detecting," "storing," "applying," "ignoring," "disregarding," "resetting," "not setting," "using," "prohibiting," or the like, refer to actions and processes (e.g., the flowcharts 700, 800, and 900 of FIGS. 7, 8, and 9, respectively) of a computing system or similar electronic computing device or processor (e.g., the device 500 of FIG. 5). The computing system or similar electronic computing device manipulates and transforms data represented as physical (electronic) quantities within the computing system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 4:
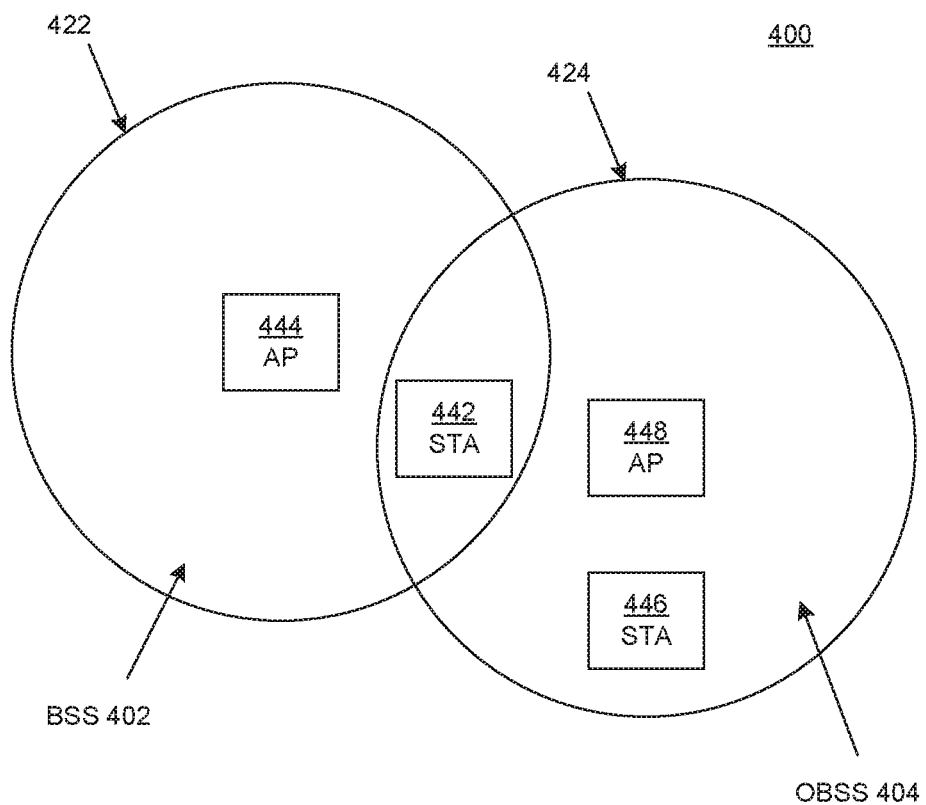
FIG. 4 is a block diagram of an example of a wireless network in which embodiments according to the present invention can be performed.

FIG. 4 is a block diagram of an example of a wireless network 400 in which embodiments according to the present invention can be performed. The network 400 may be referred to as a wireless local area network (WLAN). In embodiments, the network 400 is a High-Efficiency (HE) WLAN (HEW) and is compliant with the IEEE 802.11 ax standard.

In the example of FIG. 4, the network 400 includes a first basic service set (BSS) 402 and a second BSS 404. The circles 422 and 424 indicate the respective coverage areas of the BSSs 402 and 404. The coverage area 424 of the BSS 404 overlaps the coverage area 422 of the BSS 402, and so (from the perspective of the BSS 402) the BSS 404 is referred to as an overlapping BSS (OBSS).

The BSS 402 includes a number of wireless devices exemplified by the station (STA) 442 and the access point (AP) 444, and the OBSS 404 includes a number of wireless devices exemplified by the STA 446 and the AP 448. In the example of FIG. 4, the STA 442 contends for traffic with other STAs (not shown) in the BSS 402 and then exchanges data with the AP 444, but would also be able to receive traffic from the OBSS 404 because it is in both the coverage area of the OBSS and the coverage area of its own BSS.

Data units exchanged by the APs and STAs may include control information or data. At the physical (PHY) layer, these data units may be referred to as physical layer convergence procedure (PLOP) protocol data units (PPDUs). In some aspects, a PPDU may be referred to as a packet or physical layer packet. Each PPDU may include a preamble and a payload. The payload may include a media access control (MAC) header or data for other layers and/or user data, for example.

BSS color is a mechanism that can be used to identify OBSSs. A BSS color is a numerical identifier associated with a particular BSS. Devices (STAB and APs) are able to differentiate between BSSs using the BSS color identifiers when other devices transmit on the same channel. If a receiving device detects a frame that has a BSS color that is the same as that of the receiving device, then this is considered to be an intra-BSS transmission. In other words, the transmitting device belongs to the same BSS as the receiving device. If the detected frame has a BSS color that is different from that of the receiving device, then the receiving device considers that frame to be an inter-BSS frame from an OBSS.

More specifically, in embodiments according to the present invention, a STA transmitting a HE Operation element or a BSS Color Change Announcement element, except when the STA is a non-AP STA associated with an AP, selects a value in the range one to 63 to include in either the BSS Color subfield of the HE Operation element or the New BSS Color subfield of the BSS Color Change Announcement element that it transmits. The STA maintains that single value of the BSS Color subfield for the lifetime of the BSS or until the BSS color changes as described in section 27.16.2.1 of the IEEE 802.11 ax standard. A non-AP STA associated with an AP that is transmitting a PPDU in a direct path to a direct-link setup (DLS) or tunneled DLS (TDLS) peer STA sets the BSS Color subfield of the HE Operation element that it transmits to the peer STA to the value indicated in the BSS Color subfield of the HE Operation element received from the AP. A STA that is an AP, an independent (IBSS) STA, a TDLS STA, or a mesh STA and that transmitted a HE Operation element shall set the TXVECTOR parameter BSS_COLOR of a HE single user (SU) PPDU, a HE extended range (ER) SU PPDU, or a downlink (DL) HE multi-user (MU) PPDU to either the value indicated in the BSS Color subfield of its HE Operation element or zero.

Furthermore, an active BSS color is used to set the BSS_COLOR parameter, and is one of the following values:

a value of the BSS Color field in the received HE Operation element when a STA receives a HE Operation element from a peer STA; or a value of the New BSS Color field in the received BSS Color Change Announcement element when a STA receives a BSS Color Change Announcement element from a peer STA and the BSS color change target beacon transmission time (TBTT) has passed. A STA sets the TXVECTOR parameter BSS_COLOR for a HE SU PPDU, a HE ER SU PPDU, or an uplink (UL) HE MU PPDU that is addressed to a peer STA to the active BSS color value, if the HE STA has established any of the following: 1) an association with the peer STA; 2) a TDLS link with the peer STA; 3) a DLS link with the peer STA; or 4) an IBSS membership with the peer STA. A STA that receives an HE PPDU with RXVECTOR parameter BSS_COLOR with a value between one and 63 follows the spatial reuse procedure described below. A STA transmitting a HE SU PPDU or a HE ER SU PPDU for which one or more of the intended recipient STAs is not a member of the transmitting STA's BSS shall set the TXVECTOR parameter BSS_COLOR of the HE SU PPDU or the HE ER SU PPDU to zero. Otherwise, the STA does not set the TXVECTOR parameter BSS_COLOR of an HE PPDU to zero. Also, all APs that are members of a multiple BSS identifier (BSSID) set use the same BSS color.

Continuing with reference to FIG. 4, the STA 442 and the STA 446, although in different BSSs, can be within a same spatial reuse (SR) group (SRG). A SRG includes devices of the wireless network 400 that use one set of SR parameters for PPDUs from STAs and APs within the SRG, and another set of SR parameters for PPDUs from STAs and APs that are not part of the SRG (non-SRG).

According to IEEE 802.11ax, SRG and non-SRG frames can be determined as follows. A STA that has received a SR Parameter Set element from its associated AP with a value of one in the SRG Information Present subfield uses information provided in the SR Parameter Set element to identify BSSs that are members of the STA's SRG to determine whether or not a received inter-BSS PPDU is an SRG PPDU. A received PPDU that is an inter-BSS PPDU is an SRG PPDU if the bit in the SRG BSS Color Bitmap field which corresponds to the numerical value of the BSS_COLOR parameter of the RXVECTOR is set to one. A received very high throughput (VHT) PPDU that is an inter-BSS PPDU is an SRG PPDU if the GROUP_ID parameter of the RXVECTOR has a value of zero and the bit in the SRG Partial BSSID Bitmap field that corresponds to the numerical value of PARTIAL_AID [0:5] of the RXVECTOR is set to one. A received PPDU that is an inter-BSS PPDU is an SRG PPDU if BSSID information from a MAC protocol data unit (MPDU) of the PPDU is correctly received and the bit in the SRG Partial BSSID Bitmap field that corresponds to the numerical value of BSSID [39:44] is set to one; otherwise, the PPDU is not determined to be an SRG PPDU. A STA that has not received a SR Parameter Set element from its associated AP with a value of one in the SRG Information Present subfield does not classify any received PPDUs as an SRG PPDU.

When a STA that receives the SR Parameter Set element with the SRG Information Present subfield equal to one from its associated AP obtains a transmission opportunity (TXOP), it can use a VHT/HE PPDU format to initiate a request to send (RTS)/clear to send (CTS) mechanism. If a RTS frame is carried in an inter-BSS PPDU of a VHT or an HE PPDU format, it can be determined to be an SRG PPDU by meeting one of the following conditions: 1) the RXVECTOR parameter GROUP_ID of the received VHT PPDU is set to zero and the bit in the SRG Partial BSSID Bitmap field that corresponds to the numerical value of PARTIAL_AID [0:5] of the RXVECTOR is set to one; 2) the RXVECTOR parameter GROUP_ID of the received VHT PPDU is set to 63 and the bit in the SRG Partial BSSID Bitmap field that corresponds to the numerical value of the transmitter address (TA) [39:44] is set to one; 3) the RXVECTOR parameter UPLINK_FLAG of the received HE PPDU is set to one and the bit in the SRG Partial BSSID Bitmap field that corresponds to the numerical value of RA [39:44] is set to one; or 4) the RXVECTOR parameter UPLINK_FLAG of the received HE PPDU is set to zero and the bit in the SRG Partial BSSID Bitmap field that corresponds to the numerical value of TA [39:44] is set to one.

A received PPDU that is an inter-BSS PPDU is a SRG PPDU if BSSID information from a MPDU of the PPDU is correctly received and the bit in the SRG Partial BSSID Bitmap field that corresponds to the numerical value of BSSID [39:44] is set to one; otherwise, the PPDU is not determined to be an SRG PPDU. When the MPDU is a Data or Management frame, the BSSID information is obtained from the BSSID field. When the MPDU is a Control frame, the BSSID information is obtained from the TA field if the receiver address (RA) field is set to a broadcast address. When the MPDU is a Control frame, the BSSID information is obtained from the RA field if the RXVECTOR parameter UPLINK_FLAG is present and set to one. When the MPDU is a Control frame having the TA field, the BSSID information is obtained from the TA field if the RXVECTOR parameter UPLINK_FLAG is present and set to zero. When the MPDU is a Control frame having the TA field, the BSSID information is obtained from the TA field if the RXVECTOR parameter GROUP_ID is present and set to 63.

Stations in the network 400 may simultaneously send PLCP service data units (PSDUs) in the PPDU frame format on their allocated subchannels or on their allocated spatial streams to an AP, and may simultaneously receive PSDUs in the PPDU frame format on their allocated subchannels or on their allocated spatial streams from the AP.

Figure 5:
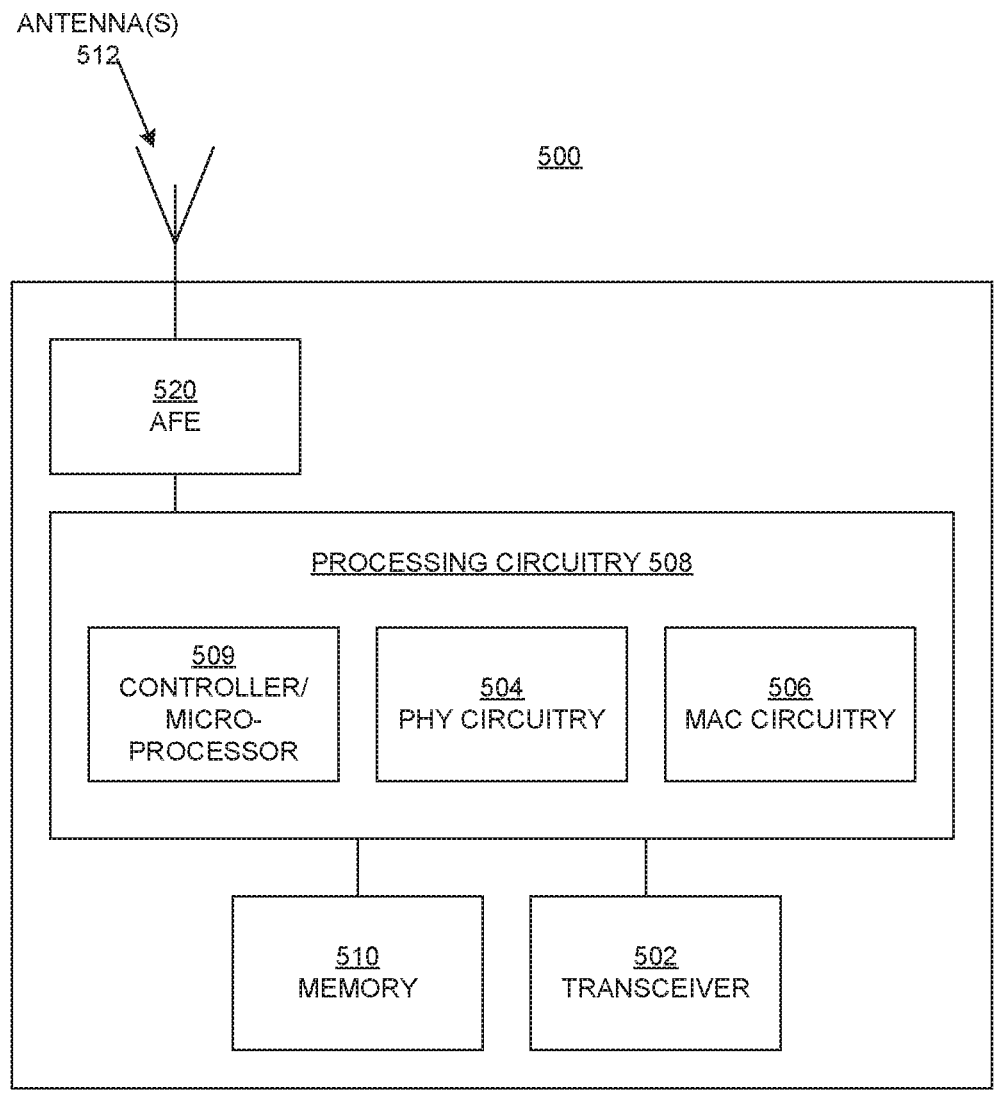
FIG. 5 is a block diagram of an example of a wireless device upon which embodiments according to the present invention can be performed.

FIG. 5 is a block diagram of an example of a wireless device 500 upon which embodiments according to the present invention can be performed. In embodiments, the wireless device 500 is a HE device or a HE-compliant device. With reference to FIG. 4, the wireless device 500 may be a STA 442 or 446 in the wireless network 400, and/or it may be an AP 444 or 448 in the wireless network. In embodiments, the wireless device 500 is configured to operate in accordance with one or more wireless communication standards as described herein, including IEEE 802.11ax.

The wireless device 500 of FIG. 5 is a device with wireless communication capability such as, but not limited to, a smartphone, a laptop or portable computer, a tablet, a headset, a digital camera, a television, and a monitoring device.

In the example of FIG. 5, the wireless device 500 includes processing circuitry 508. The processing circuitry 508 includes, for example, a controller or microprocessor 509. The processing circuitry 508 also includes physical layer circuitry (PHY circuitry) 504 and media access control layer circuitry (MAC circuitry) 506, one or more of which enables transmission and reception of signals to and from other wireless devices using one or more antennas 512. The wireless device 500 includes a transceiver 502, which includes a transmitter and a receiver.

The antenna(s) 512 can be coupled to an analog front end (AFE) module 520, which enables processing of a received modulated signal and signal conditioning for a transmitted signal. The AFE 520 can be functionally located between the antenna and a digital baseband system, to convert an analog signal into a digital signal for processing, and vice versa.

The wireless device 500 also includes memory 510 that stores instructions and other information used perform the operations described herein. The wireless device 500 is configured to decode and/or encode data units (signals, packets, and/or frames) such as PPDUs.

The PHY circuitry 504 is configured to transmit a PPDU. The PHY circuitry 504 can include, for example, circuitry for modulation and demodulation, up-conversion and down-conversion, filtering, and amplification. The PHY circuitry 504 can perform functions based on instructions stored in the memory 510.

The MAC circuitry 506 is configured to contend for a wireless medium during a contention period to receive control of the medium and to configure a PPDU. In some embodiments, the MAC circuitry 506 is configured to contend for the wireless medium based on channel contention settings, a transmitting power level, and/or a clear channel assessment (CCA) state (e.g., busy or idle).

The wireless device 500 can include components other than those illustrated or described herein, such as but not limited to a keyboard, a display, a non-volatile memory port, a power management device, and a graphics processor. Also, although the device 500 is illustrated as having several separate functional elements, one or more of the functional elements may be combined and/or may be implemented by combinations of software-configured and/or hardware-configured elements.

Transmission Between BSSs in Wireless Networks Considering Spatial Reuse

In embodiments, the memory 510 stores instructions that implement a spatial reuse manager application. In operation, using the spatial reuse manager application in conjunction with other components such as the PHY circuitry 504 and the MAC circuitry 506, the device 500 may ignore (disregard) an OBSS PPDU with a valid PHY header that has a receive power (received signal strength indication, RSSI) above a minimum power density (signal detection) threshold (see FIG. 6A). That is, under those conditions, the device 500 will treat an inter-BSS PPDU as not having been received at all: the device 500 will not update the network allocation vector (NAV), and resets the CCA state from busy to idle before the PPDU is completely received. More specifically, the device 500 does not update its NAV timers based on frames carried in the detected PPDU, and the device's MAC circuitry 506 issues a PHY-CCARESET.request primitive before the end of the PPDU. The effect of receipt of this primitive by the PHY circuity 504 is to reset the PHY CCA timers to the state appropriate for the end of a received frame and to initiate a new CCA evaluation cycle.

Even more specifically, according to IEEE 802.11ax, a non-SRG SR procedure is described as follows.

If the PHY of a STA issues a PHY-CCA.indication with a value equal to BUSY followed by an RXSTART.indication due to a PPDU reception, then the STA's MAC sublayer may a) issue a PHY-CCARESET.request primitive before the end of the PPDU and b) not update its NAV timers based on frames carried in the PPDU (thus ignoring the PPDU) if all the following conditions are met: 1) the STA has not set the TXVECTOR parameter SPATIAL_REUSE to the value SRP_and_NON_SRG_OBSS_PD_PROHIBITED in any HE PPDU it has transmitted in the current beacon period; 2) the received PPDU is an inter-BSS PPDU and the received PPDU is not a non-HT (high throughput) PPDU carrying a response frame (Ack, BlockAck or CTS frame), or the received PPDU contains a CTS and a PHY-CCA.indication transition from BUSY to IDLE occurred within the point interframe space (PIFS) time immediately preceding the received CTS and that transition corresponded to the end of an inter-BSS PPDU that contained a RTS that was ignored following this procedure; 3) the SPATIAL_REUSE subfield in the HE-SIG-A (if present) of the received PPDU is not set to SRP_AND_NON_SRG_OBSS_PD_PROHIBITED; 4) the RXVECTOR parameter RSSI_LEGACY in the PHY-RXSTART.indication primitive, which defines the received power level measured from the legacy portion of the PPDU, is below the Non-SRG OBSS_PD level; and 5) the PPDU is not one of the following: i) a non-HE PPDU that carries a frame where the RA field is equal to the STA MAC address; ii) a non-HE PPDU that carries a group addressed Public Action frame; iii) a non-HE PPDU that carries a null data packet (NDP) Announcement frame or a fine timing measurement (FTM) frame; or iv) a NDP.

Also, according to IEEE 802.11ax, the SRG SR procedure is more specifically described as follows.

If the PHY of a STA issues a PHY-CCA.indication with a value equal to BUSY followed by a PHYRXSTART.indication due to a PPDU reception then the STA's MAC sublayer may a) issue a PHY-CCARESET.request primitive before the end of the PPDU and b) not update its NAV timers based on frames carried in the PPDU (thus ignoring the PPDU) if all the following conditions are met; 1) the received PPDU is an Inter-BSS PPDU; 2) the received PPDU is an SRG PPDU; 3) the most recently received SR Parameter Set element from the AP associated with the STA had the SRG information Present subfield equal to one or the STA is an AP and its most recently transmitted SR Parameter Set element had the SRG Information Present subfield equal to one; 3) the RXVECTOR parameter RSSI_LEGACY in the PHY-RXSTART.indication primitive, which defines the received power level measured from the legacy portion of the PPDU is below the SRG OBSS_PD level defined in section 27.9.2.2 of the standard; 4) the PPDU is not one of the following: i) a non-HE PPDU that carries a frame where the RA field is equal to the STA MAC address; ii) a non-HE PPDU that carries a Public Action frame; iii) a non-HE PPDU that carries an NDP Announcement frame or an FTM frame; or iv) a NDP.

According to IEEE 802.11ax, the SR procedure includes the following SR transmit power restrictions.

If a STA ignores an inter-BSS PPDU following the procedure in section 27.9.2.1 of the standard, using a chosen SRG OBSS_PD level or a chosen non-SRG OBSS_PD level, then the STA starts an OBSS_PD SR transmit power restriction period. This OBSS_PD SR transmit power restriction period is terminated at the end of the TXOP that the STA gains once its backoff reaches zero. If a STA starts an OBSS_PD SR transmit power restriction period with a chosen non-SRG OBSS_PD level, the STA's power as measured at the output of the antenna connector shall be equal or lower than the $TX\_PWR_{max}$, calculated with this chosen non-SRG OBSS_PD level with Equation 27-4 of the standard, with the appropriate non-SRG parameters according to Table 27-2 of the standard, for the transmissions of any PPDU (including an HE TB PPDU, except when the HE TB PPDU is triggered by a Trigger frame having the carrier sense (CS) Required subfield set to zero) until the end of the OBSS_PD SR transmit power restriction period. If a STA starts an OBSS_PD SR transmit power restriction period with a chosen non-SRG OBSS_PD level, the STA's power as measured at the output of the antenna connector shall be equal or lower than the $TX\_PWR_{max}$, calculated with this chosen non-SRG OBSS_PD level with Equation 27-4 of the standard, with the appropriate non-SRG parameters according to Table 27-2 of the standard, for the transmissions of any PPDU (including an HE TB PPDU, except when the HE TB PPDU is triggered by a Trigger frame having the CS Required subfield set to zero) until the end of the OBSS_PD SR transmit power restriction period. If a STA starts an OBSS_PD SR transmit power restriction period with a chosen SRG OBSS_PD level, the STA's power as measured at the output of the antenna connector, shall be equal or lower than the $TX\_PWR_{max}$, calculated with this chosen SRG OBSS_PD level with Equation 27-4 of the standard, with the appropriate SRG parameters according to Table 27-3 of the standard, for the transmissions of any PPDU (including HE Trigger-Based (TB) PPDU, except when the HE TB PPDU is triggered by a Trigger frame having the CS Required subfield set to zero) until the end of the OBSS_PD SR transmit power restriction period. Multiple ongoing OBSS_PD SR transmit power restriction periods may overlap in time.

Figure 6A:
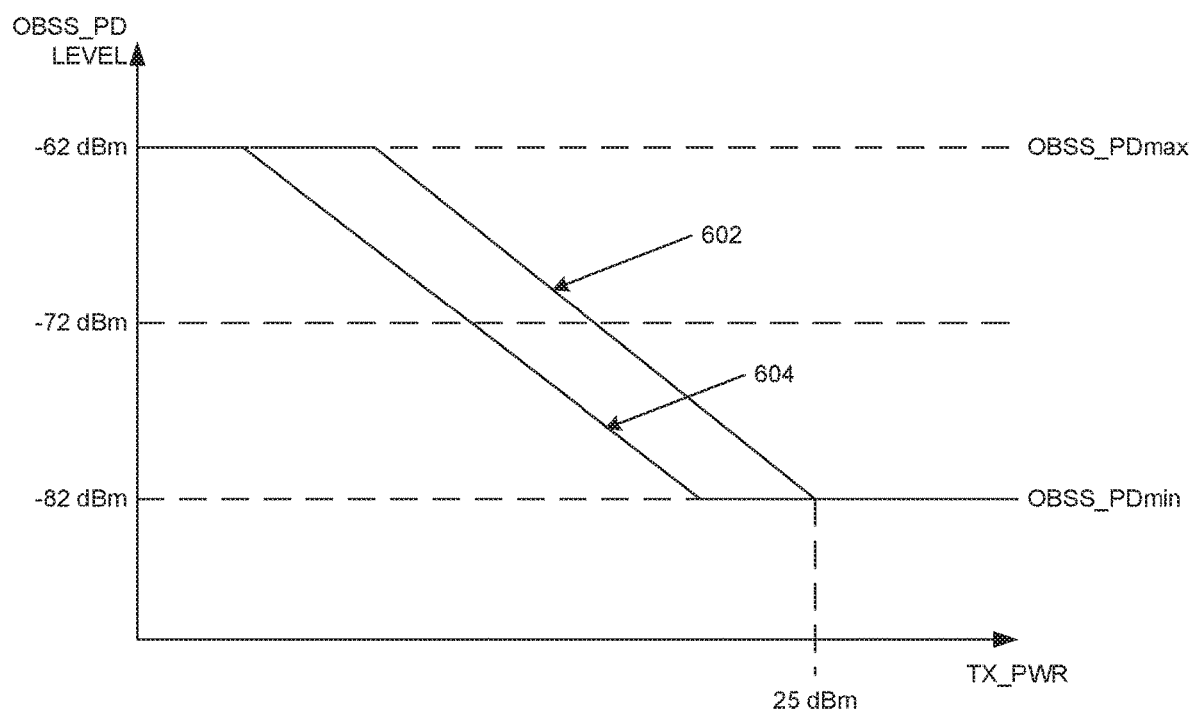
FIGS. 6A and 6B illustrate the relationships between overlapping base service set power density thresholds and transmit power for non-spatial reuse groups and spatial reuse groups, respectively, in embodiments according to the present invention.

FIG. 6A illustrates the relationship between OBSS signal detection or power density (OBSS_PD) thresholds and transmit power (TX_PWR) in embodiments according to the present invention. The TX_PWR is the power used by an STA or AP to transmit packets. OBSS_PD and TX_PWR are both measured in units of decibel-milliwatts (dBm). The OBSS_PDmax and OBSS_PDmin thresholds are default (fixed) values specified in the IEEE 802.11 standard. In an embodiment, the OBSS_PD threshold range is −82 dBm to −62 dBm as a function of the transmit power TX_PWR. A baseline proportional rule allows the OBSS_PD threshold to be adjusted as long as the corresponding transmit power level falls below curve 602 for APs or curve 604 for STAs.

In embodiments, if the RSSI of a detected PPDU is below the applicable OBSS_PD threshold, then the PPDU may be ignored. In embodiments, the OBSS_PD threshold is also used by a STA or AP to determine whether or not to spatially reuse a channel. For example, if the RSSI of a PPDU is below the applicable OBSS_PD threshold, then the STA or AP may begin transmitting another PPDU while still receiving the PPDU.

As will be described, in embodiments according to the present invention, OBSS_PD thresholds different from those shown in FIG. 6A are applied in an SRG under certain conditions. More specifically, for an SRG operation and under certain other conditions described below, an AP can alter the OBSS_PDmin value (different from the default value of FIG. 6A) against an OBSS signal from within the same SRG. Accordingly, the OBSS_PD levels shown in FIG. 6A may be referred to herein as non-SRG OBSS_PD levels.

Figure 6B:
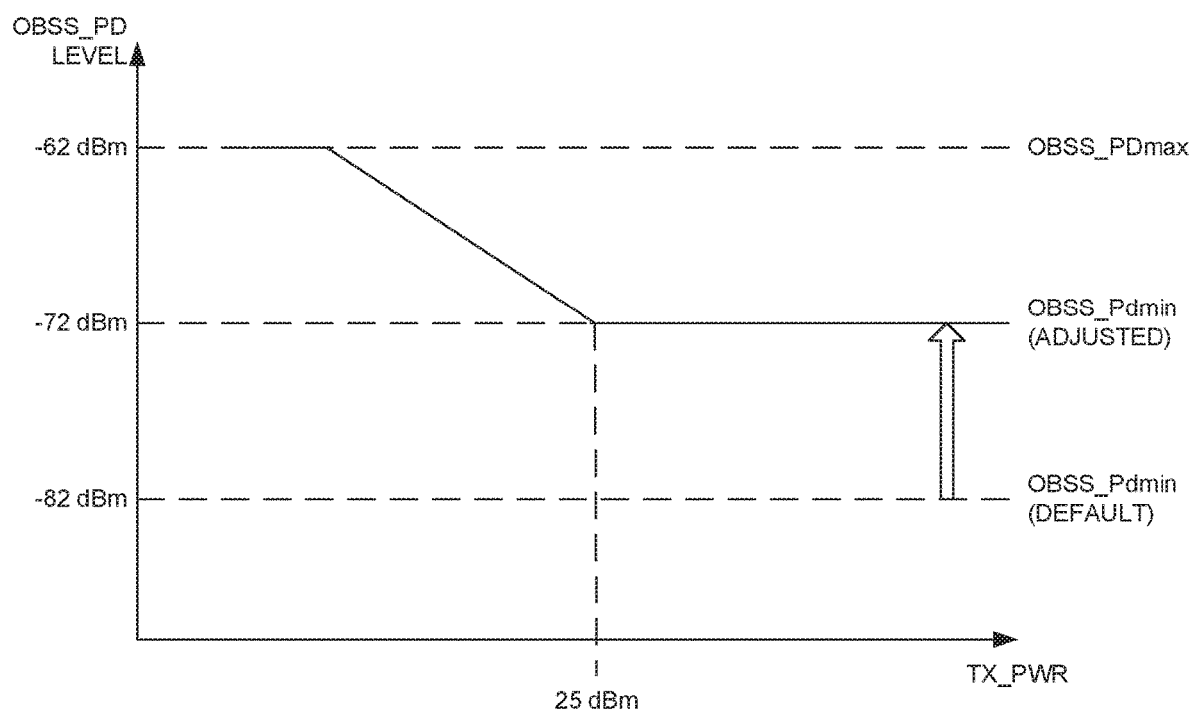

FIG. 6B illustrates the relationship between OBSS_PD thresholds and TX_PWR for SRG operations in embodiments according to the present invention. For an SRG operation, the OBSS power density threshold range for the SRG is −72 dBm to −62 dBm as a function of the transmit power TX_PWR. The OBSS_PD levels shown in FIG. 6B may be referred to herein as SRG OBSS_PD levels.

In embodiments, the conditions under which the SRG OBSS_PD thresholds of FIG. 6B are applied are now described. If the received PPDU occupies both a primary channel and a secondary channel, and if it is an SRG PPDU, then the SRG OBSS_PD thresholds can be applied on secondary channels under the following conditions: 1) If a STA ignored a 40 MHz/80 MHz/160 MHz/80+80 MHz SRG PPDU using a chosen SRG OBSS_PD level (because all SRG SR procedure conditions described above are met), then it stores the RXVECTOR parameter CH_BANDWIDTH (channel bandwidth) and the RXTIME (receive duration time) of the detected SRG PPDU. During the RXTIME of the SRG OBSS PPDU, the SRG OBSS_PD thresholds of FIG. 6B are applied on the secondary channels that are within the RXVECTOR parameter CH_BANDWIDTH. The secondary channels that are not within the RXVECTOR parameter CH_BANDWIDTH still use non-SRG OBSS_PD thresholds such as those shown in FIG. 6A.

Thus, in embodiments according to the present invention, the minimum SRG OBSS_PD threshold is increased on the secondary channels that are within the channel bandwidth of a PPDU. In other words, relative to the non-SRG OBSS_PD level versus TX_PWR curve 602 for APs shown in FIG. 6A, the OBSS_PDmin level in the same SRG is raised on the secondary channels that are within the channel bandwidth of the PPDU.

As a result of the improvements just described, weaker inter-BSS signals on those channels will not cause those secondary channels to be identified as being busy. Instead, those secondary channels can be identified as being idle and available for spatial reuse. With more channels available, overall network-level performance is increased.

In overview, in embodiments according to the invention, if a STA ignores an inter-BSS PPDU according to the SR procedure and obtains a TXOP, then the STA is prohibited from transmitting frames to a peer STA that is a member of the OBSS associated with the inter-BSS PPDU. For example, a STA may receive a Beacon frame from an OBSS AP, where the Beacon frame contains the HE Operation element with the BSS color subfield set to a value of A. When the STA subsequently ignores an inter-BSS PPDU with the BSS_COLOR parameter set to A and obtains a TXOP, the STA will not transmit frames to the OBSS AP during the TXOP time interval. Also, in embodiments, a STA that ignores an inter-BSS PPDU following the SR procedure and obtains a TXOP is also prohibited from transmitting a broadcast public action frame (e.g., a management Action frame with the Category field set to Public, that may, for example, allow an inter-BSS and AP to communicate with an unassociated STA).

Figure 7:
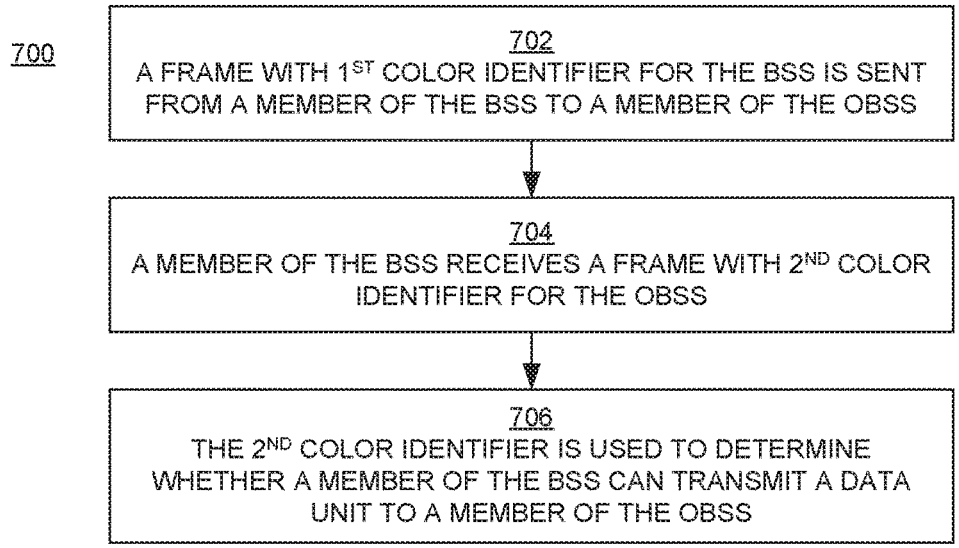
FIGS. 7, 8, and 9 are flowcharts of examples of operations in device-implemented methods for transmission between base service sets in wireless networks considering spatial reuse in embodiments according to the present invention.
Figure 8:
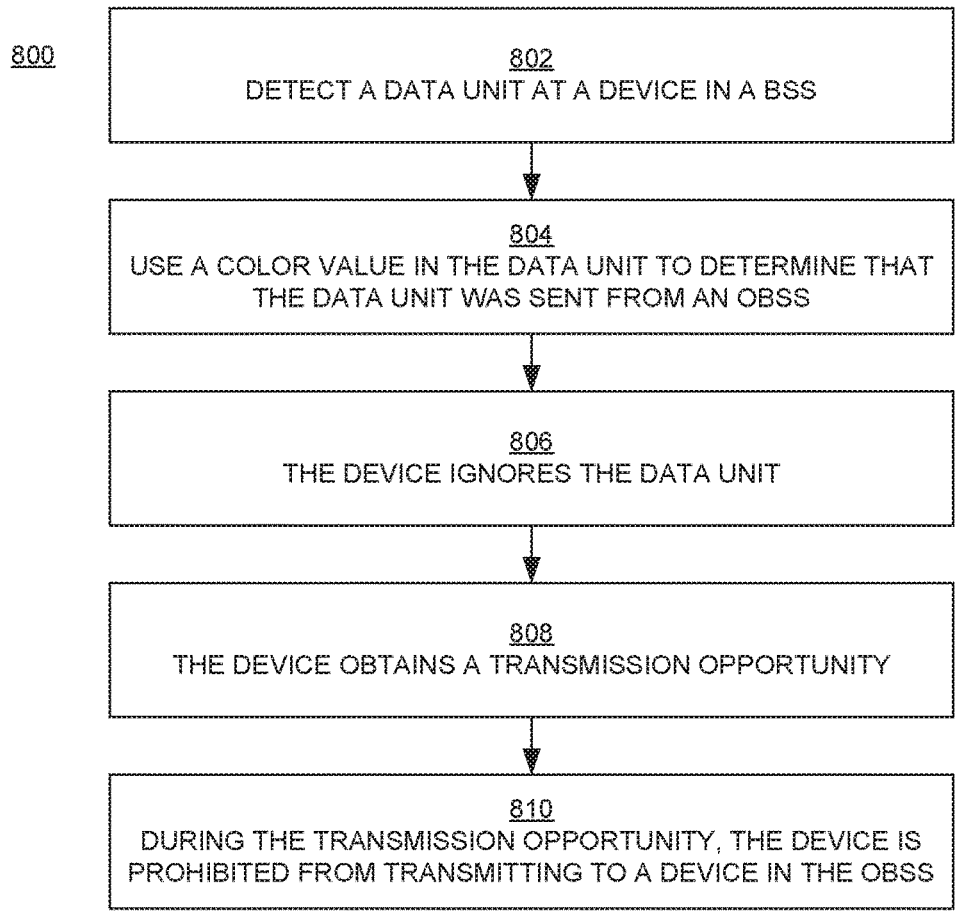
Figure 9:
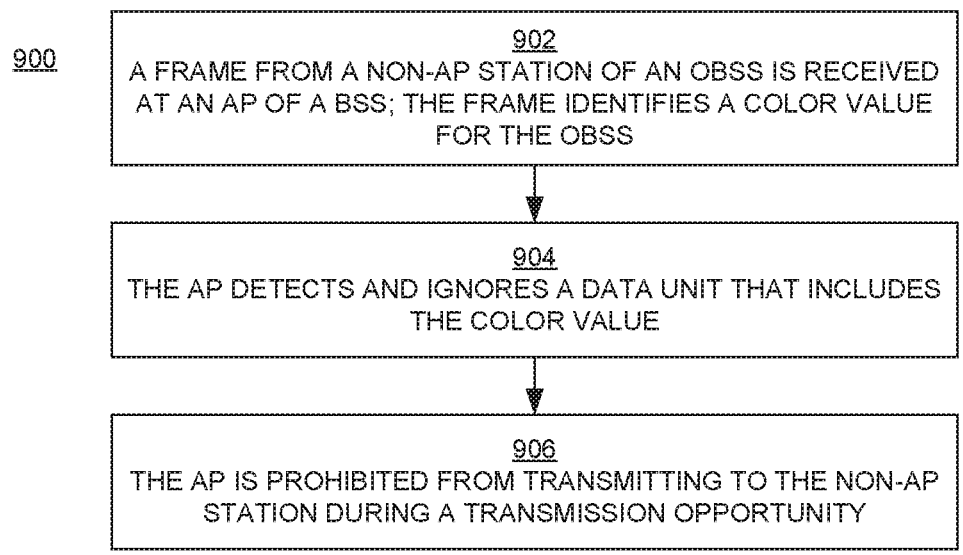

FIGS. 7, 8, and 9 are flowcharts 700, 800, and 900, respectively, of examples of operations in device-implemented methods for transmission between BSSs in wireless networks (e.g., HE networks like the network 400 of FIG. 4, for example) considering spatial reuse in embodiments according to the present invention. The operations can be performed in and by, for example, the wireless device 500 of FIG. 5. The operations described below are not necessarily performed in the order in which they are described.

With reference first to FIG. 7, in block 702, a frame that includes a field that identifies a first color identifier associated with the BSS can be sent from a wireless device (e.g., a STA) that is a member of (associated with) the BSS to a wireless device (e.g.; an AP) that is a member of (associated with) the OBSS. The frame may be a beacon frame or an event report frame, for example.

A BSS color-in-use bit or field in, for example, an event report frame enables a non-AP STA to signal a BSS color-in-use by the non-AP STA to its associated AP. Table 1 is an example showing event type definitions in an event request.

TABLE 1

| Name | Event Type |
| --- | --- |
| BSS Color Collision | 4 |
| BSS Color-in-Use | 5 |
| Reserved | 6-220 |

In block 704, in embodiments, a wireless device that is a member of the BSS (e.g., an AP) receives a frame (e.g.; a beacon frame or an event report frame) from a wireless device (e.g., a STA) that is a member of the OBSS, where the frame includes a field that identifies a second color identifier associated with the OBSS.

In block 706, the second color identifier is used to determine whether a wireless device that is a member of the BSS is prohibited from transmitting data units (e.g., PPDUs) to a wireless device that is a member of the OBSS during the time interval of a TXOP on a channel identified as idle according to the spatial reuse procedure described above.

More specifically, with reference to the embodiments of FIG. 8, in block 802, a data unit (e.g., a PPDU) is detected at a first wireless device (e.g., an AP) that is a member of a BSS. The data unit was sent on a channel from a second wireless device (e.g., a non-AP STA) that is a member of an OBSS.

In embodiments, the data unit includes a color value associated with the OBSS (e.g., the second color identifier mentioned above). In block 804, that color value is used to determine that the data unit was sent from the OBSS.

In block 806, the first wireless device ignores the data unit after detecting the data unit. For example, a NAV timer based on frames in the data unit is not set, and the CCA state of the channel is reset from busy to idle before all frames of the data unit are received by the first wireless device.

In block 808, after ignoring the data unit, a spatial reuse procedure is performed and the first wireless device obtains a transmission opportunity (e.g., a TXOP) that includes a time interval during which the first wireless device can transmit on the channel.

In block 810, during the time interval of the transmission opportunity, the first wireless device is prohibited from transmitting a data unit to a wireless device that is a member of the OBSS. In an embodiment, the first wireless device is also prohibited from trans ting a broadcast public action frame during the transmission opportunity.

With reference now to FIG. 9, in block 902, a frame (e.g., a beacon frame or an event report frame) from a wireless non-AP station of an OBSS is received at an AP of the BSS. The frame identifies, to the AP, a color value associated with the non-AP station (that is, the frame includes the color value associated with the OBSS).

In block 904, the AP subsequently ignores a data unit that includes the color value that was in the frame (that is, the data unit includes a color-in-use value that matches the color value associated with the OBSS).

Consequently, in block 906, the AP is prohibited from transmitting to the non-AP station during a specified time interval (e.g., the time interval of a TXOP).

Embodiments according to the present invention result in fewer collisions between frame packets. Consequently, fewer packets are lost, reducing the number of packets that need to be retransmitted, and therefore making more efficient use of device and network resources including computational resources and bandwidth.

Embodiments according to the invention thus improve computer technologies (e.g., by improving the efficiency and performance of wireless communication devices) and computer-related technologies (e.g., by improving the quality and performance of wireless mesh networks).

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The example methods described and/or illustrated herein may also omit one or more of the steps described or illustrated herein or include additional steps in addition to those disclosed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the present invention.

Embodiments according to the invention are thus described. While the present invention has been described in particular embodiments, it should be appreciated that the invention should not be construed as limited by such embodiments, but rather construed according to the following claims.

What is claimed is:

1. A method performed by a device in a wireless network, the method comprising:
   detecting a data unit at a first wireless device that is a member of a first basic service set (BSS) of the wireless network, the data unit sent on a channel from a second wireless device that is a member of a second overlapping basic service set (OBSS) of the wireless network;
   the first wireless device ignoring the data unit after said detecting the data unit; and
   the first wireless device obtaining a transmission opportunity comprising a time interval that begins after said detecting, wherein the first wireless device is permitted to transmit on the channel during the time interval of the transmission opportunity and wherein, during the time interval of the transmission opportunity, the first wireless device is prohibited from transmitting a frame to a wireless device that is a member of the OBSS.

2. The method of claim 1, wherein the data unit is a physical layer convergence procedure (PLCP) protocol data unit (PPDU).

3. The method of claim 1, wherein the first wireless device is an access point (AP) and the second wireless device is a non-AP station.

4. The method of claim 1, wherein said ignoring comprises:
   not setting a network allocation vector (NAV) timer based on frames in the data unit; and resetting a state of a clear channel assessment (CCA) for the channel from busy to idle before all frames of the data unit are received by the first wireless device.

5. The method of claim 1, further comprising, prior to said detecting, receiving a frame at the first wireless device, the frame comprising a field that identifies a color value associated with the OBSS.

6. The method of claim 1, wherein the data unit comprises a color value associated with the OBSS, wherein said detecting comprises using the color value to determine that the data unit was sent from the OBSS.

7. The method of claim 1, wherein further the first wireless device is also prohibited from transmitting a broadcast public action frame during the transmission opportunity.

8. In a wireless network comprising a first basic service set (BSS) and an overlapping second basic service set (OBSS), a method comprising:
    receiving, at a wireless device that is a member of the BSS from a wireless device that is a member of the OBSS, a frame comprising a field that identifies a color identifier that is associated with the OBSS; and
    using the color identifier in the field of the frame to determine whether the wireless device of the BSS is prohibited from transmitting a data unit to the wireless device of the OBSS during a time interval of a transmission opportunity on a channel identified as idle according to a spatial reuse procedure; wherein the time interval of the transmission opportunity begins after the frame is received, and wherein, during the transmission opportunity, the wireless device of the BSS is prohibited from transmitting the data unit to a wireless device that is a member of the OBSS.

9. The method of claim 8, wherein the frame is a type of frame selected from the group consisting of: a beacon frame, and an event report frame.

10. The method of claim 8, wherein the wireless device of the BSS is an access point (AP), and wherein the wireless device of the OBSS is a non-AP station.

11. The method of claim 8, wherein said using the color identifier to determine whether the wireless device of the BSS is prohibited from transmitting to the wireless device of the OBSS during a transmission opportunity on a channel identified as idle according to a spatial reuse procedure comprises:
    detecting, at the wireless device of the BSS, a first data unit on the channel and determining that the first data unit includes the color identifier;
    the wireless device of the BSS ignoring the first data unit after said detecting and determining; and
    after said ignoring, the wireless device of the BSS obtaining the transmission opportunity.

12. The method of claim 11, wherein the data unit is a physical layer convergence procedure (PLCP) protocol data unit (PPDU).

13. The method of claim 11, wherein said ignoring comprises:
    not setting a network allocation vector (NAV) timer based on frames in the data unit; and
    resetting a state of a clear channel assessment (CCA) for the channel from busy to idle before all frames of the data unit are received by the wireless device.

14. The method of claim 11, wherein further the wireless device is also prohibited from transmitting a broadcast public action frame during the transmission opportunity.

15. The method of claim 8, wherein the time interval of the transmission opportunity is after backoff.

16. In a wireless network comprising a first basic service set (BSS) and an overlapping second basic service set (OBSS), a method comprising:
    receiving, at a wireless access point (AP) of the BSS, a frame from a wireless non-AP station of the OBSS that identifies, to the AP, a color value associated with the non-AP station;
    ignoring, by the AP, a data unit comprising a color-in-use value that matches the color value, and;
    the AP obtaining a transmission opportunity comprising a time interval during which the AP can transmit on a channel on which the data unit was sent, wherein the time interval of the transmission opportunity begins after the frame is received at the AP;
    wherein the AP is prohibited from transmitting to the non-AP station of the OBSS during a specified time interval that corresponds to the time interval of the transmission opportunity.

17. The method of claim 16, wherein the frame is a type of frame selected from the group consisting of: a beacon frame, and an event report frame.

18. The method of claim 16, wherein the data unit is a physical layer convergence procedure (PLCP) protocol data unit (PPDU).

19. The method of claim 16, wherein said ignoring comprises:
    not setting a network allocation vector (NAV) timer based on frames in the data unit; and
    resetting a state of a clear channel assessment (CCA) for the channel from busy to idle before all frames of the data unit are received by the AP.

20. The method of claim 16, wherein further the AP is also prohibited from transmitting a broadcast public action frame during the transmission opportunity.

* * * * *